(12) United States Patent
Tong

(10) Patent No.: US 8,842,449 B1
(45) Date of Patent: Sep. 23, 2014

(54) LLC RESONANT CONVERTER WITH LOSSLESS PRIMARY-SIDE CURRENT FEEDBACK

(71) Applicant: XP Power Limited, Singapore (SG)

(72) Inventor: Vinh Quang Tong, Mission Viejo, CA (US)

(73) Assignee: XP Power Limited, Singapore (SG)

( * ) Notice: Subject to any disclaimer, the term of this patent is extended or adjusted under 35 U.S.C. 154(b) by 0 days.

(21) Appl. No.: 13/797,661

(22) Filed: Mar. 12, 2013

(51) Int. Cl.
   *H02M 3/335* (2006.01)

(52) U.S. Cl.
   CPC .................................. *H02M 3/33507* (2013.01)
   USPC ....................................................... 363/21.02

(58) Field of Classification Search
   USPC .......... 363/16, 17, 21.02, 21.03, 56.02, 95, 98
   See application file for complete search history.

(56) References Cited

U.S. PATENT DOCUMENTS

| | | | | |
|---|---|---|---|---|
| 6,154,375 | A * | 11/2000 | Majid et al. | 363/16 |
| 7,706,158 | B2 * | 4/2010 | Gordon | 363/56.12 |
| 2007/0165426 | A1 * | 7/2007 | Kyono | 363/21.02 |
| 2011/0242856 | A1 * | 10/2011 | Halberstadt | 363/17 |
| 2011/0261592 | A1 * | 10/2011 | Samejima et al. | 363/21.02 |
| 2011/0267844 | A1 * | 11/2011 | He et al. | 363/21.02 |

OTHER PUBLICATIONS

Hong Huang, "Feedback Loop Design of an LLC Resonant Power Converter", Texas Instruments, Nov. 2010, Texas Instruments Incorporated.
Author Unknown, "8-Pin High-Performance Resonant Mode Controller", Texas Instruments, Jul. 2011, Texas Instruments Incorporated.

* cited by examiner

*Primary Examiner* — Nguyen Tran
(74) *Attorney, Agent, or Firm* — Van Pelt, Yi & James LLP

(57) ABSTRACT

An LLC resonant converter implements a primary-side current feedback scheme. The LLC resonant converter includes an isolation transformer having a primary winding and at least one secondary winding and is controlled by a control circuit to operate at a switching frequency. The LLC resonant converter includes a first capacitor connected to the primary winding through AC coupling to sense a first voltage indicative of a current flowing through the primary winding of the isolation transformer, and a current sense circuit configured to receive the first voltage and to generate a feedback signal. The feedback signal is coupled to the control circuit to regulate the switching frequency in response to the current at the primary winding. In another embodiment, the current sense circuit is a current and voltage sense circuit configured to sense a voltage at the primary winding.

5 Claims, 3 Drawing Sheets

LLC RESONANT CONVERTER WITH LOSSLESS PRIMARY-SIDE CURRENT FEEDBACK

BACKGROUND OF THE INVENTION

The present invention relates to current sensing in a LLC resonant converter, and more particularly, to an LLC resonant converter using lossless current feedback.

Resonant converters are used in high voltage applications where high frequency operation and low switching losses are desired. Common resonant converter topologies include the LC series resonant converter and the LLC resonant converter which is a modified LC series resonant converter including a shunt inductor across the transformer primary winding. The LLC resonant converter has many advantages over the LC series resonant converter. For instance, the LLC resonant converter can regulate the output voltage over wide line and load variations with a relatively small variation of switching frequency. The LLC resonant converter can also achieve zero voltage switching over the entire operating range which improves efficiency.

In the conventional LLC resonant converter, the switching frequency of the converter is regulated by a voltage feedback loop, typically implemented using an opto-coupler transistor to sense the output voltage. Sensing the output voltage for feedback control often results in power loss.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, an LLC resonant converter implements a primary-side current feedback scheme which senses the current at the transformer primary winding for regulating the switching frequency of the converter. The primary-side current feedback scheme is particularly advantageous when the LLC resonant converter is configured to generate multiple DC output voltages. In particular, the primary-side current feedback scheme measures the total current load of the LLC resonant converter on the transformer primary winding so that the multiple DC output voltages of the LLC resonant converter are regulated collectively without needing to sense the individual output voltage values. Furthermore, in one embodiment, the current sensing is implemented using an AC coupling so that lossless current sensing is realized. In one embodiment, the LLC resonant converter is a half-bridge LLC resonant converter. In other embodiments, the LLC resonant converter can be a full-bridge LLC resonant converter.

Figure 1:
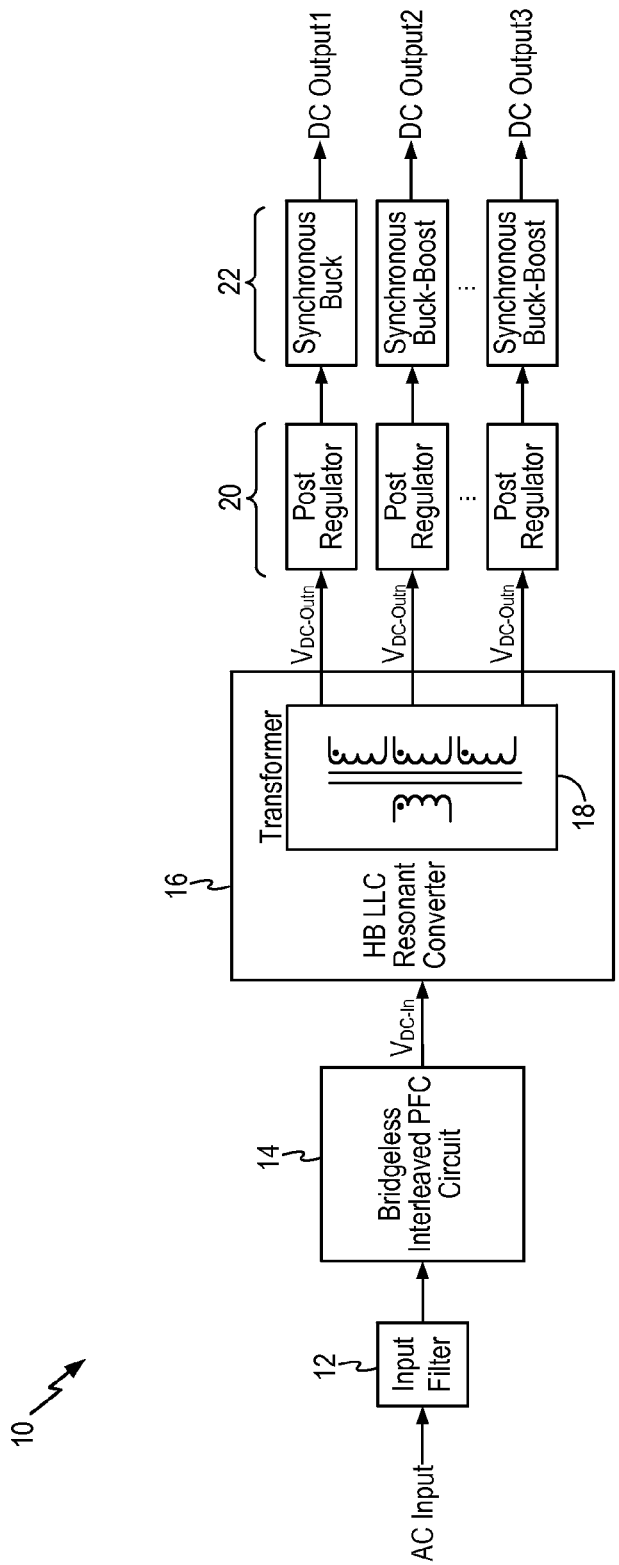
FIG. 1 is a schematic diagram illustrating an AC-to-DC power converter incorporating a half-bridge LLC resonant converter according to one embodiment of the present invention.

In one example, a half-bridge LLC resonant converter implementing the primary-side current feedback scheme according to embodiments of the present invention is incorporated in an AC-to-DC power converter to convert an input AC voltage to one or more regulated DC output voltages. FIG. 1 is a schematic diagram illustrating an AC-to-DC power converter incorporating a half-bridge LLC resonant converter according to one embodiment of the present invention. Referring to FIG. 1, a power converter 10 receives an AC input voltage and generates one or more regulated DC output voltages at the same or different voltage levels. For example, the AC input voltage may be the AC line voltage (e.g. 120 VAC) and the regulated output voltages may include 5V, 12V and 24V for powering various electronic devices.

The power converter 10 includes an input filter 12 for EMI (electromagnetic interference) filtering. The power converter 10 further includes an AC-to-DC converter 14 implemented as a bridgeless interleaved power factor correction (PFC) circuit to convert the AC input voltage to a DC voltage. In embodiments of the present invention, the PFC circuit 14 is implemented using a bridgeless interleaved boost topology. The DC converted voltage from the PFC circuit is then coupled to a half-bridge LLC resonant converter 16 which generates one or more DC output voltages having voltage levels regulated by the duty cycle or the switching frequency of the resonant converter. The half-bridge LLC resonant converter 16 includes an isolation transformer 18 operative to transfer power supplied to the LLC resonant converter to one or more DC output voltages while providing isolation for the subsequent circuitry. In embodiments of the present invention, the half-bridge LLC resonant converter 16 receives the DC input voltage $V_{DC-In}$ supplied from the PFC circuit 14 and generates one or more DC output voltages $V_{DC-Outn}$. In the present embodiment, transformer 18 includes a primary winding and multiple secondary windings to generate multiple DC output voltages $V_{DC-Outn}$.

Power converter 10 further includes a set of post regulators 20 receiving the output voltages from half-bridge LLC resonant converter 16 and generating respective DC output voltages. The DC output voltages generated by the post regulators 20 may not have the accuracy level desired. Power converter 10 further includes a set of synchronous buck or buck-boost converters 22 to receive the output voltages of the post regulators 20 and generate a set of regulated DC output voltages DC Output1 to DC Output3. The synchronous buck or buck-boost converters 22 generate regulated DC output voltages having the desired voltage value within the desired accuracy limits. In this manner, power converter 10 generates one or more regulated DC output voltages from the AC input voltage.

Figure 2:
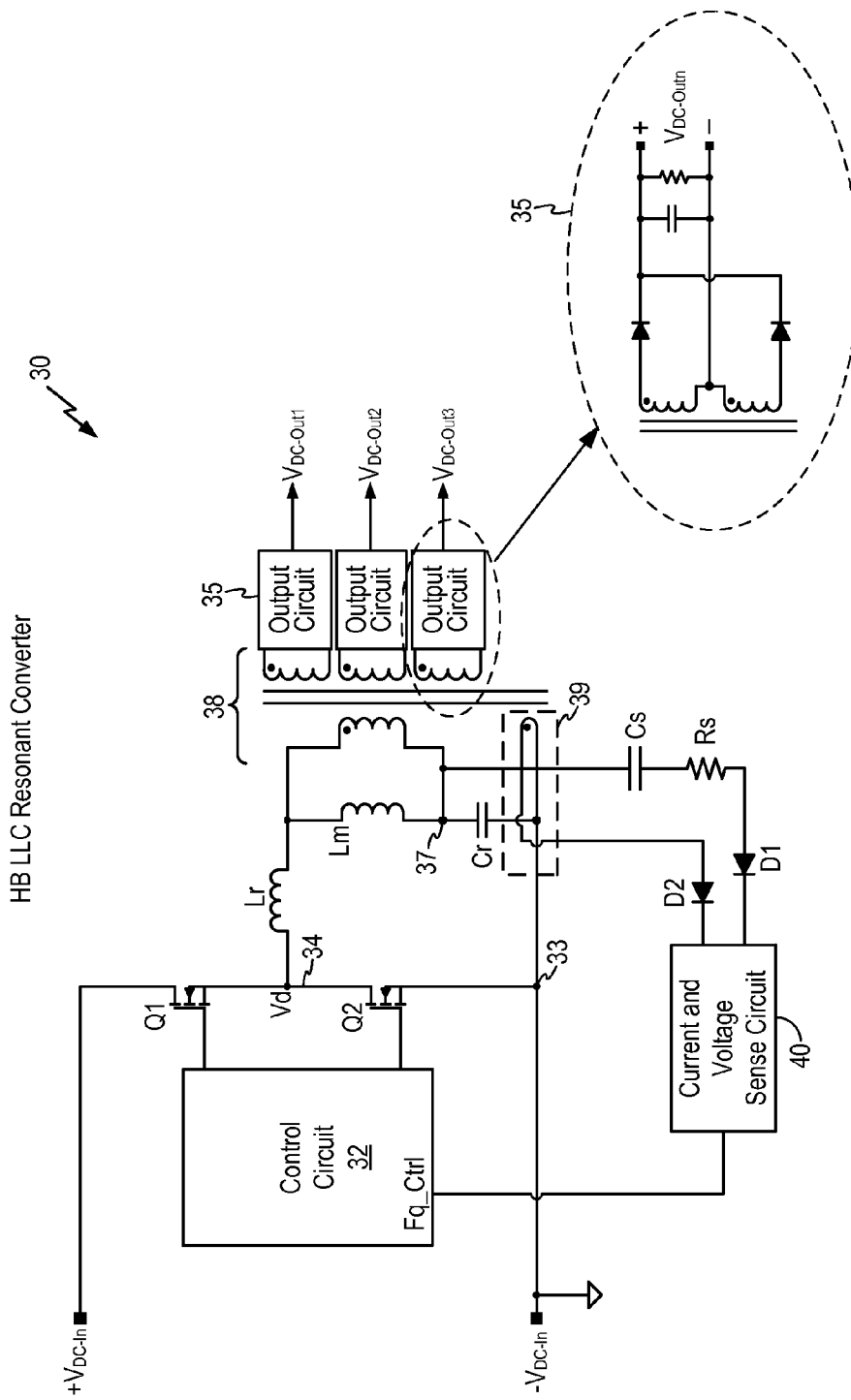
FIG. 2 is a schematic diagram of a multiple-output half-bridge LLC resonant converter implementing a primary-side current feedback scheme according to one embodiment of the present invention.

FIG. 2 is a schematic diagram of a multiple-output half-bridge LLC resonant converter implementing a primary-side current feedback scheme according to one embodiment of the present invention. Referring to FIG. 2, a multiple-output half-bridge LLC resonant converter 30 includes a high-side switch Q1 and a low-side switch Q2 connected in series across the DC input voltage $V_{DC-In}$. Switches Q1 and Q2 are driven by a control circuit 32 to turn on and off at a given switching frequency to generate a driving voltage Vd at a common node 34 coupled to a series resonant inductor Lr and an isolation transformer 38. The LLC resonant converter 30 also includes a shunt inductor Lm and a series resonant capacitor Cr connected in series with the inductor Lr between the common node 34 and a neutral or ground node 33. In the present embodiment, isolation transformer 38 includes one primary winding and multiple secondary windings to generate multiple DC output voltages. Each secondary winding is coupled to an output circuit 35 to generate a DC output voltage $V_{DC-Outn}$. In the present embodiment, the output circuit 35 is implemented in a half-bridge topology as shown in the insert in FIG. 2. In other embodiments, the output circuit 35 can be implemented in a full-bridge topology.

Conventional LLC resonant converters regulate the switching frequency using a voltage feedback loop. In particular, the DC output voltage at the secondary winding side is sensed and coupled back to the control circuit, usually through the use of an opto-coupler. Conventional voltage feedback control methods become impractical when the LLC resonant converter is configured to generate multiple output voltages. In the case of multiple outputs, the feedback loop needs multiple voltage feedback circuit to monitor each output voltage to feed back all measurements to the control circuit. The feedback loop becomes impractical to implement, especially for large number of output voltages.

In accordance with embodiments of the present invention, the half-bridge LLC resonant converter implements a primary-side current feedback scheme. In particular, the current and voltage at the primary side of the isolation transformer 38 are sensed and the sensed current and voltage are used to regulate the switching frequency of the resonant converter. In this manner, regardless of how many output voltages are generated at the secondary side, only one feedback loop is needed for any number of output voltages to maintain all output regulation. In embodiments of the present invention, the current and voltage at the primary side of the isolation transformer 38 are indirectly sensed by sensing the voltage across the resonant capacitor Cr (node 37) and by sensing the voltage at the primary winding.

In one embodiment, a current sense capacitor Cs is connected to the resonant capacitor Cr (node 37) at the primary winding of isolation transformer 38. In particular, current sense capacitor Cs senses the current flow in the primary winding through AC coupling such that no DC loss is incurred by the current sensing. More specifically, because capacitor Cs is AC coupled, no DC current flow through the capacitor and thus the current measurement incurs no power loss. A sense resistor Rs and a diode D1 are connected in series with the sense capacitor Cs to generate a first voltage value indicative of the current at the primary winding.

In one embodiment, the voltage at the primary winding is sensed by coupling a one or more turn windings 39 on the isolation transformer 38. The sensed voltage is rectified by a diode D2 to generate a second voltage value indicative of the voltage at the primary winding.

The first and second voltage values are coupled to a current and voltage sense circuit 40 to generate a feedback signal indicative of the sensed current at the primary winding. The diode D1 is configured so that current flows into the current and voltage sense circuit 40 while blocking current from being injected into the sense capacitor Cs. That is, the anode of the diode D1 is connected to the sense resistor Rs while the cathode of the diode D1 is connected to the current and voltage sense circuit 40. The feedback signal generated is coupled to a frequency control (Fq_Ctrl) terminal of the control circuit 32 to control the switching frequency of switches Q1 and Q2. The control circuit 32 changes the switching frequency of the resonant converter 30 in response to the feedback signal.

Figure 3:
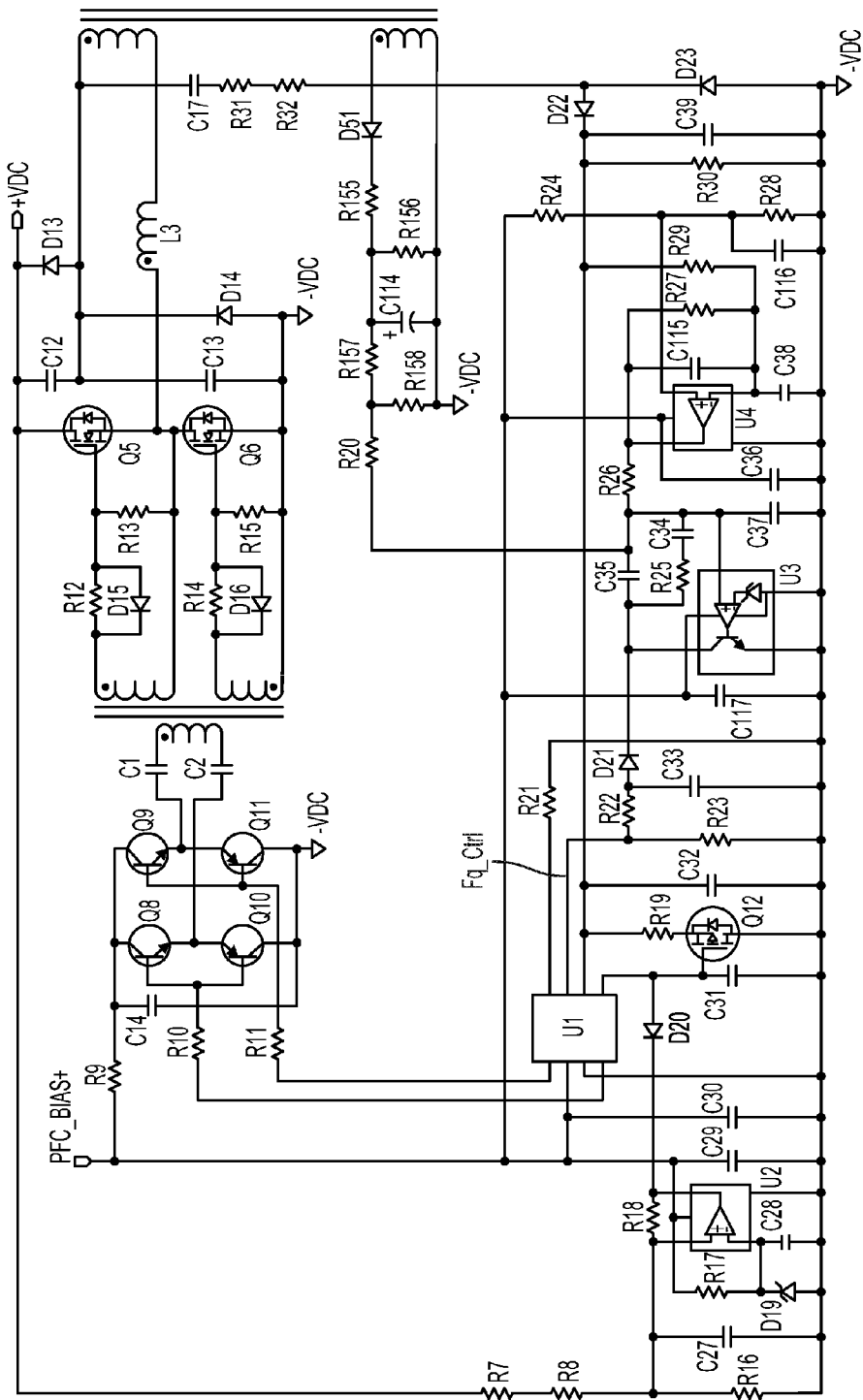
FIG. 3 is a schematic diagram illustrating a LLC resonant converter implementing the primary-side current feedback scheme in embodiments of the present invention.

In embodiments of the present invention, control circuit 32 sets the switching frequency of the converter based on the amount of current flowing out of the frequency control (Fq_Ctrl) terminal. Thus, current and voltage sense circuit 40 is configured to control the amount of current flow out of the frequency control Fq_Ctrl terminal to set the desired switching frequency. FIG. 3 is a schematic diagram illustrating a LLC resonant converter implementing the primary-side current feedback scheme in embodiments of the present invention. Referring to FIG. 3, the primary side current and voltage are indirectly sensed through the voltage across the resonant capacitors C12, C13 and by coupling one or more turn windings on the isolation transformer where the sensed voltage is rectified through a diode D51. Current sensing is realized by AC coupling through capacitor C17. FIG. 3 illustrates one implementation of a current and voltage sense circuit for using the voltage measurement taken by capacitor C17 from the primary winding to control the switching frequency of the converter by controlling the current flow out of the frequency control terminal Fq_Ctrl.

In the embodiment described in FIG. 2, the half-bridge LLC resonant converter is configured to generate multiple DC output voltages. In other embodiments, the primary-side current feedback scheme can be applied to a half-bridge LLC resonant converter configured to generate a single DC output voltage. In the case of a single output LLC resonant converter, the primary-side current feedback scheme realizes the advantages of lossless measurement through the use of AC coupling.

Furthermore, in the embodiment described in FIG. 2, the LLC resonant converter is implemented using a half-bridge topology at the output circuit. In embodiments of the present invention, the primary-side current feedback scheme can be applied to a half-bridge LLC resonant converter or a full-bridge LLC resonant converter.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An LLC resonant converter being controlled by a control circuit to operate at a switching frequency, the LLC resonant converter comprising:
   an isolation transformer having a primary winding and a plurality of secondary winding to generate a plurality of output voltages;
   a high-side switch and a low-side switch connected in series across a DC input voltage, the high-side switch and the low-side switch being driven by the control circuit to turn on and off at the switching frequency to generate a driving voltage at a common node, the driving voltage being coupled to a series resonant inductor coupled between the common node and the primary winding of the isolation transformer;

a shunt inductor and a series resonant capacitor connected in series with the series resonant inductor between the common node and a neutral or ground node of the DC input voltage, the shunt inductor being connected in parallel with the primary winding of the isolation transformer;

a first capacitor connected to the primary winding through AC coupling to sense a current flowing through the primary winding of the isolation transformer with no DC current flow, the first capacitor being connected in series with a first resistor and a first diode to generate a first voltage indicative of the current flowing through the primary winding of the isolation transformer, the first diode having an anode coupled to the first resistor and a cathode;

one or more turn windings on the isolation transformer in parallel with the primary winding to sense a second voltage being indicative of a voltage at the primary winding; and a current and voltage sense circuit configured to receive the first voltage indicative of the current of the primary winding and the second voltage indicative of the voltage at the primary winding, the cathode of the first diode being coupled to the current and voltage sense circuit, the current and voltage sense circuit being configured to generate a feedback signal, the feedback signal being coupled to the control circuit to regulate the switching frequency of the high-side switch and the low-side switch in response to the current and the voltage at the primary winding to maintain output regulation for all of the plurality of output voltages.

2. The LLC resonant converter of claim 1, wherein the current and voltage sense circuit controls a current flow from a frequency control terminal of the control circuit to regulate the switching frequency of the converter.

3. The LLC resonant converter of claim 1, wherein the LLC resonant converter comprises a half-bridge LLC resonant converter.

4. The LLC resonant converter of claim 1, wherein the LLC resonant converter comprises a full-bridge LLC resonant converter.

5. The LLC resonant converter of claim 1, further comprising:

a second diode connected in series between the one or more turn windings and the current and voltage sense circuit, the second diode having an anode coupled to the one or more turn windings and a cathode coupled to the current and voltage sense circuit, the second diode being configured to rectify the sensed voltage at the primary winding.

* * * * *